US011886511B2

(12) United States Patent
Gupta et al.

(10) Patent No.: US 11,886,511 B2
(45) Date of Patent: *Jan. 30, 2024

(54) MACHINE-LEARNED DESKING VEHICLE RECOMMENDATION

(71) Applicant: Tekion Corp, Pleasanton, CA (US)

(72) Inventors: Nitika Gupta, Bengaluru (IN); Ved Surtani, Bengaluru (IN)

(73) Assignee: Tekion Corp, Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/835,182

(22) Filed: Jun. 8, 2022

(65) Prior Publication Data

US 2023/0080589 A1    Mar. 16, 2023

Related U.S. Application Data

(63) Continuation of application No. 17/472,407, filed on Sep. 10, 2021, now Pat. No. 11,386,161.

(51) Int. Cl.
*G06F 16/903* (2019.01)
*G06N 20/00* (2019.01)
(Continued)

(52) U.S. Cl.
CPC .... *G06F 16/90335* (2019.01); *G06F 16/9035* (2019.01); *G06F 16/9038* (2019.01); *G06N 20/00* (2019.01)

(58) Field of Classification Search
CPC ............ G06N 20/00; G06N 3/08; G06N 5/04; G06N 3/02; G06Q 30/0631; G06Q 30/0206; G06Q 30/0283
See application file for complete search history.

(56) References Cited

U.S. PATENT DOCUMENTS 11,386,161 B1    7/2022  Gupta et al.
2012/0230548 A1    9/2012  Calman et al.
(Continued)

FOREIGN PATENT DOCUMENTS

KR    10-2019-0109703 A    9/2019

OTHER PUBLICATIONS

International Search Report and Written Opinion, Patent Cooperation Treaty Application No. PCT/US2022/042882, dated Jan. 2, 2023, 11 pages.

(Continued)

*Primary Examiner* — Hau H Hoang
(74) *Attorney, Agent, or Firm* — Fenwick & West LLP

(57) ABSTRACT

Systems and methods are disclosed herein for machine-learned vehicle desking operations. A vehicle recommendation system receives a request to determine similarities between vehicles. The request can indicate an identifier of a user-specified vehicle associated with vehicle attribute values (e.g., white color, sedan body style, 2020 manufacturing year, etc.). A machine learning model can determine respective embeddings for the vehicle attribute values and the respective embeddings can be concatenated, where the concatenated embeddings represent the user-specified vehicle in one embedding. The system can determine similarity metrics of the concatenated embeddings against reference embeddings. For example, a cosine similarity value can be determined for the concatenated embedding of the user-specified vehicle and the respective reference embeddings. Each similarity metric can represent a measure of similarity between the user-specified vehicle and a given vehicle. The vehicle recommendation system provides for display identifiers of vehicles that are ranked based on the determined similarity metrics.

20 Claims, 8 Drawing Sheets

(51) Int. Cl.
*G06F 16/9038* (2019.01)
*G06F 16/9035* (2019.01)

(56) References Cited

U.S. PATENT DOCUMENTS

2015/0363865 A1  12/2015  Ramanuja et al.
2020/0364564 A1  11/2020  Barnwal et al.
2021/0149971 A1   5/2021  Duan et al.

OTHER PUBLICATIONS

United States Office Action, U.S. Appl. No. 17/472,407, dated Dec. 15, 2021, 18 pages.

MACHINE-LEARNED DESKING VEHICLE RECOMMENDATION

CROSS REFERENCE TO RELATED APPLICATIONS

This application is a continuation of prior, co-pending U.S. patent application Ser. No. 17/472,407, filed on Sep. 10, 2021, which is incorporated herein by reference for all purposes.

TECHNICAL FIELD

The disclosure generally relates to the field of machine learning, and more particularly relates to analyzing vehicle attributes using neural networks.

BACKGROUND

A dealer management system (DMS) helps a vehicle dealership manage an inventory of vehicles. Within a vehicle dealership's day-to-day operations, there is a vehicle discovery process where a client may provide the dealership with attributes of a desired vehicle. A desking manager finds a similar vehicle in a process known as "vehicle desking." The search may be automated. Existing methods for searching for physical objects having myriad characteristics are neither robust nor accurate. Using an indexing system to locate an object that sufficiently matches another object is impractical and requires huge computational expense where a number of characteristics that are being compared is high, in that an index would need to be referenced on every dimension corresponding to every compared characteristic. While machine learning models have been successfully implemented to search for virtual assets, like streaming video and audio media, these areas benefit from robust training data obtained from millions of subscribers who have been accessing such systems for decades. Obtaining robust enough training data for physical objects to achieve accurate similarity analyses is impractical or impossible given a lack of historical data from which to draw. Other complexities of training data for physical objects arise when training data becomes irrelevant as features of physical objects become obsolete or the training data for new features of physical objects are scarce. Accordingly, existing systems and recommendation tools are insufficient for identifying vehicles similar to a desired vehicle.

SUMMARY

Systems and methods are disclosed herein for machine-learned vehicle comparisons. A vehicle recommendation system can determine and recommend vehicles based on the vehicles' similarity to a desired vehicle or desired vehicle attributes. Applications of a vehicle recommendation system include desking processes at a vehicle dealership or vehicle recommendations on a dealership or original equipment manufacturer (OEM) website. The vehicle recommendation system may use correlation metrics (e.g., mutual information), vehicle attribute selection, a machine learning model (e.g., a neural network), and vector similarity to recommend similar vehicles that account for a target attribute. The vehicle recommendation system may use a target attribute against which similarity among vehicles should be analyzed (e.g., a valuation or popularity). For example, while silver and white are different colors, a silver and a white vehicle may be more similar to one another than two white vehicles due to a similarity in a history of clients acquiring a particular silver vehicle who had previously acquired white vehicles. In this example, the vehicle recommendation system can use popularity or purchase frequency history as a target attribute.

The vehicle recommendation system increases processing efficiency by employing a machine learning model to generate numeral representations of vehicle attributes in advance. For example, the vehicle recommendation system can use a neural network to pre-generate embeddings for vehicle attributes, which can be queried from a database upon a client's request (e.g., using a client-specified vehicle identifier). Further, the vehicle recommendation system increases processing efficiency by reducing the amount of vehicle attributes selected to train the machine learning model. In some embodiments, the vehicle recommendation system uses an algorithm for determining a correlation between vehicle attributes to reduce the number of vehicle attributes selected. For example, the vehicle recommendation system uses mutual information between vehicle attributes and the valuation amount of vehicles to select a subset of vehicle attributes to train a neural network. The selected attributes may be used to train the machine learning model instead of all attributes available. The model can be retrained based on user feedback of the recommended vehicle or periodically retrained when a database of vehicle attributes is updated.

Further yet, the vehicle recommendation system can increase processing efficiency by using vector similarities (e.g., cosine similarities) to find similar vehicles instead of processing intensive methods such as index based searches. For example, the vehicle recommendation system calculates cosine similarities between an embedding representing a client's desired vehicle and embeddings representing available vehicles within a dealership's inventory. The vehicle recommendation system may consider a desired budget when determining similar vehicles by filtering or sorting recommended, similar vehicles according to the desired budget.

In one embodiment, a vehicle recommendation system receives a request to determine similarities between vehicles. The request can indicate an identifier of a user-specified vehicle associated with vehicle attribute values (e.g., white color, sedan body style, 2020 manufacturing year, etc.). A neural network can determine respective embeddings for the vehicle attribute values and the respective embeddings can be concatenated, where the concatenated embeddings represent the user-specified vehicle in one embedding. The vehicle recommendation system can determine similarity metrics of the concatenated embeddings against reference embeddings (e.g., pre-generated embeddings). For example, a cosine similarity value can be determined for the concatenated embedding of the user-specified vehicle and the respective reference embeddings. Each similarity metric can represent a measure of similarity between the user-specified vehicle and a given vehicle. The vehicle recommendation system provides for display identifiers of vehicles that are ranked based on the determined similarity metrics.

The neural network may be trained to receive an input vector of a first dimension comprising vehicle attribute values and output an embedding vector of a second dimension representing the vehicle attribute values. The neural network may perform dimension reduction such that the second dimension is smaller than the first dimension. The vehicle recommendation system may pre-generate embeddings using vehicle attribute values from an inventory of vehicles and store the generated embeddings (e.g., for subsequent similarity metric determinations). The vehicle attribute values may include a color, make, model, year, safety feature, or any combination thereof.

The vehicle recommendation system may determine mutual information between a vehicle attribute and a target attribute (e.g., a valuation amount of the vehicle attribute). In a process of filtering the number of vehicle attributes evaluated, a predefined number of vehicle attributes having high mutual information may be selected and their values input into the neural network. The neural network may include a hidden layers, where each hidden layer further includes hidden nodes. The vehicle recommendation system may train the neural network by determining weights associated with connections between the hidden nodes to minimize a loss function such that generated embeddings are representative of similar ranges of valuation amount for attributes mapped to an embedding.

The neural network can be re-trained by adjusting a dimension of a hidden layer to minimize the loss function. Additionally or alternatively, the neural network can be re-trained by adjusting weights based on feedback received from a user regarding their approval with the determination of similar vehicles. The vehicle recommendation system may determine that the loss function is minimized by determining that a mean additive error of a valuation amount of a recommended vehicle output by the neural network and a valuation amount of a user-specified vehicle is below a threshold error. The neural network can be re-trained periodically. For example, the neural network can be re-trained when an automotive inventory database is periodically updated, where the database stores vehicle attribute-value pairs.

Rather than limiting similarity determinations to basic qualities that characterize an attribute, which may lead to vehicle recommendations that are not comprehensive, the vehicle recommendation system utilizes additional qualities that can be associated with the attribute. For example, the vehicle recommendation system may use RGB values of colors in addition to the purchase history of vehicles based on their color to determine the similarity of vehicles. These additional qualities can increase the robustness of training data used to train a machine learning model. The vehicle recommendation system derives relationships between vehicle attributes using mutual information, which improves the quality (e.g., accuracy) of similarity determinations by identifying the vehicle attributes that are more relevant to a user (e.g., via a target attribute specified by a user). The trained machine learning model generates numerical representations of vehicle attributes that can be compared using vector similarities, which are less processing intensive than methods based on indexing. The vehicle recommendation system thus leverages mutual information and machine learning to generate comprehensive and accurate vehicle similarity determinations. Accordingly, the vehicle recommendation system addresses challenges faced by a DMS that searches for vehicles.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 is a block diagram of a system environment in which a vehicle recommendation system operates, in accordance with at least one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Vehicle Recommendation System Environment

Figure 1:
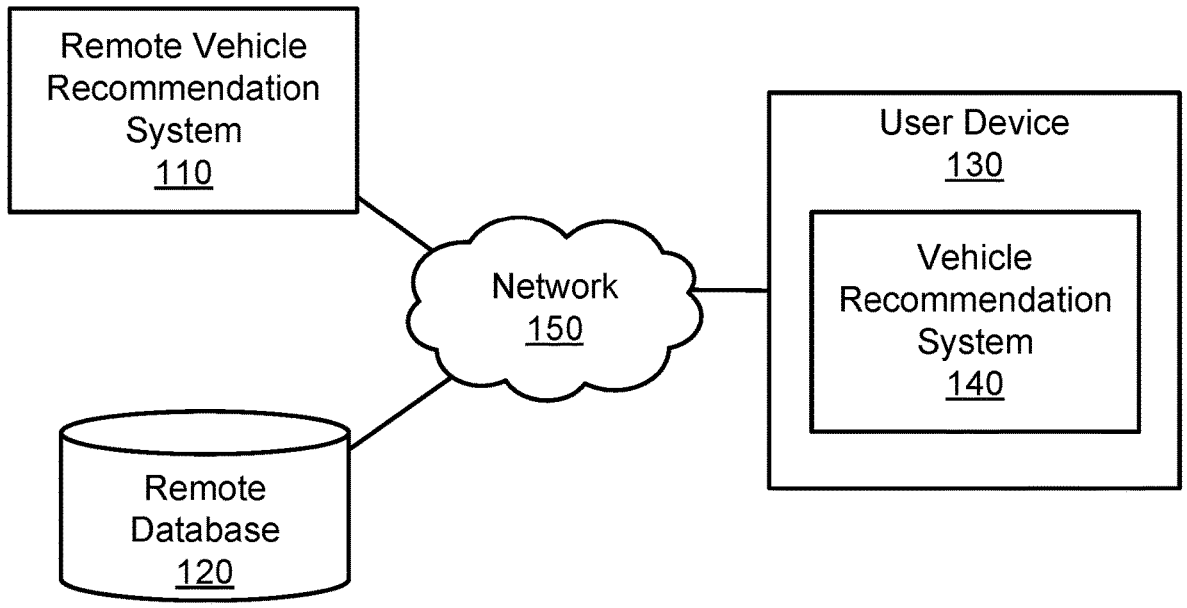

FIG. 1 is a block diagram of system environment 100 in which vehicle recommendation system 140 operates, in accordance with at least one embodiment. System environment 100 includes remote vehicle recommendation system 110, remote database 120, user device 130, vehicle recommendation system 140, and network 150. System environment 100 may have alternative configurations than shown in FIG. 1, including for example different, fewer, or additional components. For example, remote vehicle recommendation system 110 may be communicatively coupled to a third party vehicle manufacturer through network 150.

Vehicle recommendation systems described herein (e.g., vehicle recommendation system 110 or 140) determine similarities between vehicles. As referred to herein, a "vehicle" may refer to an automobile, bicycle, scooter, aircrafts, watercrafts, or any suitable machine for transportation. The vehicle may be automated, semiautomated, or manually operated. The vehicle recommendation systems use a machine learning model (e.g., a neural network) to determine numerical or alphanumerical representations, or "embeddings," of vehicle attributes. The machine learning model is trained to represent a variety of vehicle attributes (e.g., various colors of vehicles) in a latent space, where the vehicle recommendation system reduces the dimension of the latent space to improve processing efficiency while minimizing a loss function to maintain accurate numerical representations of attributes. Further, the dimension reduction enables the vehicle recommendation system to achieve more accurate information about a user's preference, where similar attributes are closer in the latent space and more likely to be preferred by a user. For example, while the colors white and gray do not match lexically, but when their embeddings are projected in lower dimensions, the embeddings will be similar. This may indicate that the colors are similar and that the user could prefer both colors. The vehicle recommendation systems use the embeddings to determine similarity metrics (e.g., vector similarities between embeddings) to determine quantitative measures by which other vehicles are similar to a particular vehicle (e.g., specified using a vehicle identification number (VIN) by the user).

The vehicle recommendation system may generate embeddings in advance of a user's request to determine similarities between vehicles. In some embodiments, the vehicle recommendation system generates embeddings for vehicle attributes retrieved from third parties (e.g., vehicle manufacturers or distributors) and stores them into a database (e.g., remote database 120) for subsequent determinations of similarity metrics. Accordingly, the vehicle recommendation system may determine an embedding once rather than with each user request to the vehicle recommendation system. This reduces the processing resources needed, which may be substantial due to the quantity of processing from a neural network. The vehicle recommendation system may also reduce processing resources by filtering which vehicle attributes are selected for embedding generation. Because similarity may be determined with respect to a specific target (e.g., different colors may be similarly priced or similarly popular), the vehicle recommendation system may select vehicle attributes that are most relevant to a target attribute using correlation metrics (e.g., mutual information) between vehicle attributes and the target attribute. By determining which attributes are not relevant and can be excluded from input into a neural network, the vehicle recommendation system reduces the amount of processing resources used.

Remote vehicle recommendation system 110 provides embedding generation and comparison from a remote server to user device 130 through network 150. In some embodiments, user devices can remotely access the functionalities of the vehicle recommendation system described herein in addition or alternatively to a local version of the system (e.g., vehicle recommendation system 140). The functionalities provided to user device 130 by remote vehicle recommendation system 110 may be the full functionality of local vehicle recommendation system 140 or a subset of the functionality. Remote vehicle recommendation system 110 may be capable of performing the full functionality of the vehicle recommendation system described herein. For example, remote vehicle recommendation system 110 may train and apply a neural network using data stored in remote database 120, and transmit the resulting embedding from the neural network for storage in remote database 120 or to user device 130. In another example, remote vehicle recommendation system 110 may train neural networks and provide the trained neural networks to local systems such as vehicle recommendation system 140.

Remote database 120 stores data for determining similarity between vehicles (e.g., vehicles available in a dealership's inventory). Remote database 120 may store vehicle attributes and values, correlation metrics between vehicle attributes, and embeddings generated by a neural network of the vehicle recommendation system. Remote database 120 may receive vehicle attributes and values from third parties over network 150. Vehicle attributes include vehicle construction information, vehicle operation information, vehicle performance information, identification information, appearance information, or any other information describing a vehicle. A correlation metric may be a numerical representation of the relevancy of a particular vehicle attribute in determining a target attribute. Example correlation metrics include mutual information, Kendall's rank correlation coefficient, Pearson's correlation coefficient, Spearman's rank correlation coefficient, results of a chi-square test, or any other suitable measurement for a correlation between two numerical quantities or objects that can be represented numerically. User device 130 and remote vehicle recommendation system 110 may transmit generated embeddings to database 120 for storage. Data stored in remote database 120 may be queried by vehicle recommendation systems 110 or 140. In some embodiments, data is stored in a data structure such that data may be queried using an identifier (e.g., a key for a key-value pair). For example, embeddings of vehicle attributes and a concatenated embeddings of the vehicle attribute embeddings may be stored in a data structure in remote database 120, and a concatenated embedding is linked to a VIN used to query for the concatenated embedding.

Figure 8:
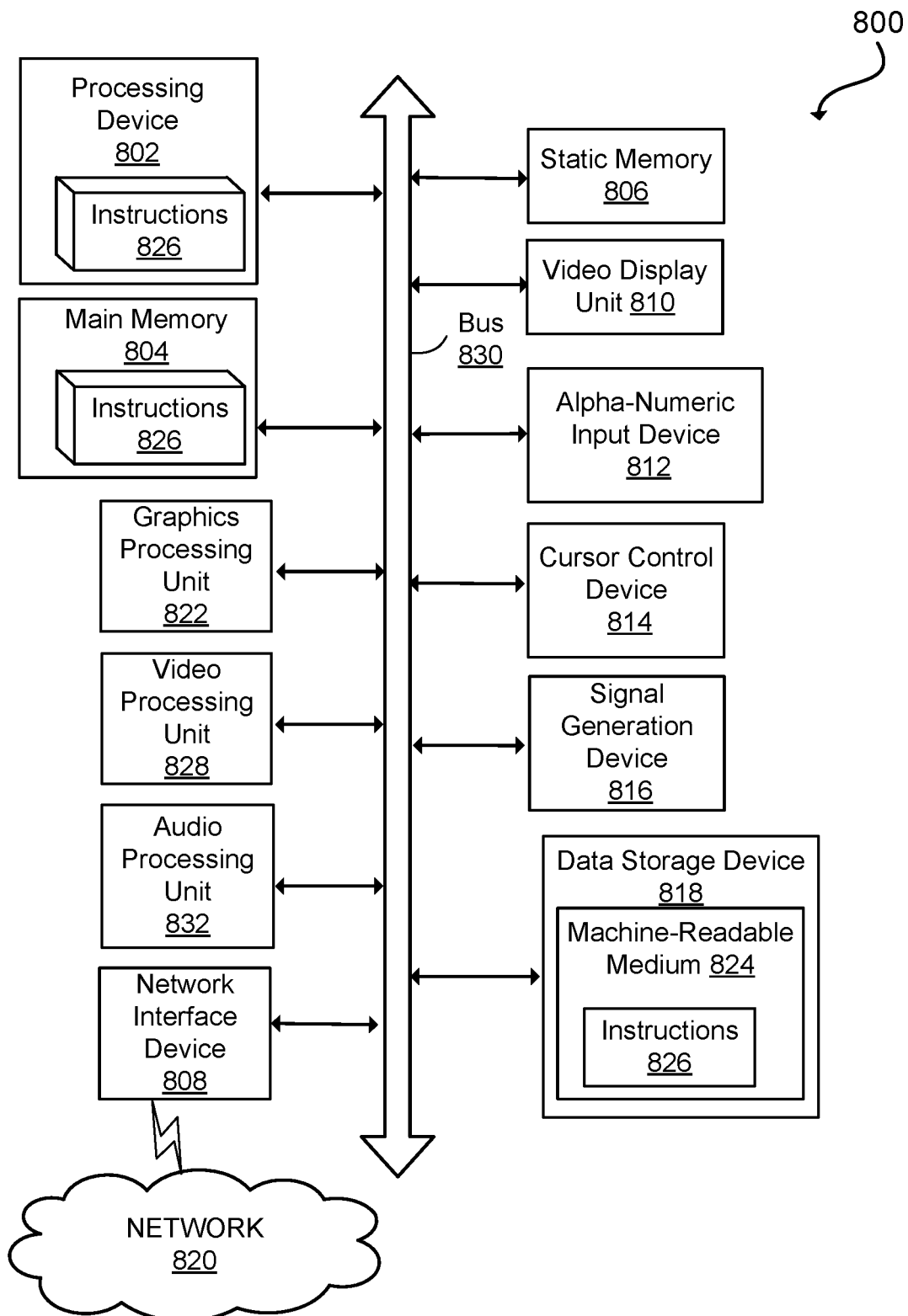
FIG. 8 is a block diagram illustrating components of an example machine able to read instructions from a machine-readable medium and execute them in a processor (or controller), in accordance with at least one embodiment.

User device 130 is an example of a computing device for users to determine similarities between vehicles as enabled by vehicle recommendation system 140. For example, system 140 may provide for display on user device 130 an interface to specify an identifier of a vehicle for which the user is requesting similar vehicles be determined. In some embodiments, the computing device is a conventional computer system, such as a desktop or a laptop computer. Alternatively, the computing device may be a device having computer functionality, such as a personal digital assistant (PDA), a mobile telephone, a smartphone, or another suitable device. The computing device is configured to communicate with systems 110 or 140 via network 150, for example using a native application executed by the computing device and provides functionality of systems 110 or 140, or through an application programming interface (API) running on a native operating system of the computing device, such as IOS® or ANDROID™ Some or all of the components of a computing device are illustrated in FIG. 8.

Vehicle recommendation system 140 determines similarity metrics between vehicles using embeddings generated by a model (e.g., a neural network). Vehicle recommendation system 140 may access a database (e.g., remote database 120) to retrieve vehicle attributes to generate the embeddings (e.g., for each attribute value), which can then be stored in database 120. Vehicle recommendation system 140 may receive a request from an interface of user device 130 indicating an identifier of a vehicle for which a user wants to determine similar vehicles. Vehicle recommendation system 140 may access reference embeddings from remote database 120 or a local database to determine similarity metrics between the user-specified vehicle and other vehicles. Reference embeddings may be pre-generated embeddings generated by a machine learning model of vehicle recommendation system 110 or 140 or an embedding generated by a third party and accessible by vehicle recommendation system 110 or 140. Using the similarity metrics, vehicle recommendation system 140 may determine identifiers of vehicles to display at user device 130 to inform the user how similar other vehicles are to the user's specified vehicle. Vehicle recommendation system 140 is described in further detail in the description of FIG. 2.

The network 150 may serve to communicatively couple remote vehicle recommendation system 110, remote database 120, user device 130, and vehicle recommendation system 140. For example, the vehicle recommendation system 140 and the remote vehicle recommendation system 110 are configured to communicate via the network 150. In some embodiments, the network 150 includes any combination of local area and/or wide area networks, using wired and/or wireless communication systems. The network 150 may use standard communications technologies and/or protocols. For example, the network 150 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 110 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network 150 may be encrypted using any suitable technique or techniques.

Vehicle Recommendation System

Figure 2:
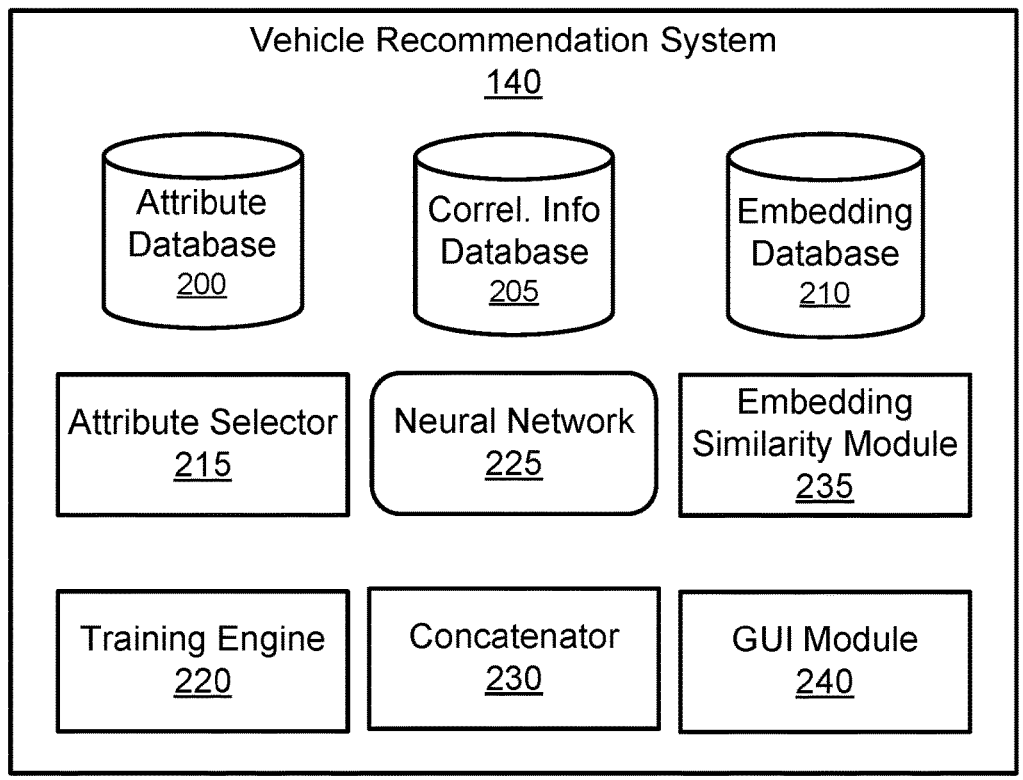
FIG. 2 is a block diagram of a vehicle recommendation system of FIG. 1, in accordance with at least one embodiment.

FIG. 2 is a block diagram of vehicle recommendation system 140 of FIG. 1, in accordance with at least one embodiment. Vehicle recommendation system 140 includes or accesses local databases such as attribute database 200, correlation information database 205, and embedding database 210. Although not pictured, vehicle recommendation system 140 may also include or access databases storing information regarding user transactions (e.g., history of vehicle purchases, which are also referred to herein as "acquisitions") or user characteristics (e.g., age, location, vehicle preferences, etc.). Vehicle recommendation system 140 includes software modules such as attribute selector 215, training engine 220, concatenator 230, embedding similarity module 235, and GUI module 240. Vehicle recommendation system 140 includes one or more machine learning models such as a neural network 225. Vehicle recommendation system 140 may have alternative configurations than shown in FIG. 2, including different, fewer, or additional components. For example, vehicle recommendation system 140 may include additional models (e.g., statistical models) for determining similarities between vehicles.

Attribute database 200 stores vehicle attribute values. Vehicle attributes can include vehicle construction information, vehicle operation information, vehicle performance information, identification information, and appearance information, or a combination thereof. Vehicle construction information may include height, length, weight, cargo capacity, ground clearance, or any suitable attribute of constructing the vehicle's structure. Vehicle operation information may include air conditioning, cruise control, seating materials, safety features (e.g., braking system or airbags), or any suitable attribute of the vehicle's operation. Vehicle performance information may include fuel economy, turning radius, or any suitable attribute of the vehicle's movement quality. Identification information may include the vehicle's make, model, year, VIN, or any suitable data for identifying the vehicle. Appearance information may include color, bumper stickers, scratches, dents, or any suitable attribute of the vehicle's appearance.

The vehicle attribute values may be linked to attributes in attribute-value pairs such that the values may be accessed by querying attribute database 200 using an attribute. For example, vehicle recommendation system 140 may periodically query database 200 for values of a particular attribute (e.g., vehicle color) and generate corresponding embeddings for the values (e.g., white, pearl white, quartz, ivory, etc.) using neural network 225. Vehicle recommendation system 140 may receive vehicle attributes over network 150 from vehicle manufacturers, distributors, or any suitable third party that provides vehicle specification information. In some embodiments, vehicle recommendation system 140 receives vehicle attributes according to what is in a third party's inventor of available vehicles (e.g., vehicles that are available to be acquired by a client of a dealership). The vehicle attributes stored in database 200 may be periodically updated. For example, as a vehicle manufacturer releases a new vehicle for public purchase, vehicle recommendation system 140 may access updated vehicle attributes and corresponding values of the new vehicle.

Correlation information database 205 stores correlation metrics (e.g., mutual information) between a vehicle attribute and a target attribute. Mutual information may be a numerical representation of the relevancy of a particular vehicle attribute in determining a target attribute (i.e., a measure of the mutual dependence between the values of the two attributes). For example, the mutual information between a vehicle's make and a vehicle's valuation amount (e.g., cost in dollars) may be high while the mutual information between air conditioning and a vehicle's valuation amount is low (e.g., because air conditioning is not a luxury feature that increases the valuation amount of a vehicle). Database 205 may receive mutual information calculated from a third party that is communicatively coupled to vehicle recommendation system 140, remote vehicle recommendation system 110, or vehicle recommendation system 140. In some embodiments, vehicle recommendation system 140 can determine mutual information and store the determined mutual information in database 205.

Mutual information may be determined as provided by information theory, using entropy and conditional entropy of the two vehicle attributes. Vehicle recommendation system 140 may calculate various probabilities between two vehicle attributes (e.g., conditional and marginal probabilities). For example, vehicle recommendation system 140 calculates the conditional probability that a vehicle has a valuation amount of $100,000 given a particular make (e.g., a luxury brand) is 30% and calculates the conditional probability that a vehicle has a valuation amount of $20,000 given a different make (e.g., a more accessible brand) is 40%. Further, because the entropy of a vehicle having a particular make or valuation amount is relatively high, vehicle recommendation system 140 may determine that the mutual information between vehicle make and valuation amount is high. In another example, the mutual information between the attribute of a vehicle having AC and the attribute of valuation amount may be lower due to the entropy of a vehicle having AC being low, as vehicles very commonly have AC. Attribute selector 215 may access database 205 to determine which vehicle attributes have the highest mutual information with a target attribute. For example, attribute selector 215 may select vehicle make, year, assisted driving, fuel consumption, and acceleration for input into neural network 225 because the aforementioned attributes are the five attributes with the highest mutual information with a vehicle's valuation amount. Although mutual information is used throughout the description of the figures herein, the vehicle recommendation system may use any additional or alternative correlation metric such as Kendall's rank correlation coefficient, Pearson's correlation coefficient, Spearman's rank correlation coefficient, or the results of a chi-square test.

Embedding database 210 stores embeddings generated by vehicle recommendation system 140 (e.g., by neural network 225). The embeddings may be stored in a data structure. For example, each embedding output by neural network 225 may be linked with the corresponding vehicle attribute value that was input to neural network 225 to generate the embedding. By storing the generated embeddings, vehicle recommendation system 140 conserves the processing resources that would have been used to determine the embedding anew. For example, vehicle recommendation system 140 may receive vehicle attribute values of a vehicle desired by a user and retrieve embeddings stored in database 210 instead of calculating the embeddings anew. The embeddings in database 210 may be accessed by embedding similarity module 235 to determine similarity metrics between embeddings and thus, a similarity between vehicle attributes. For example, a cosine similarity may be determined between a first concatenated embedding representing a first vehicle and its attributes and a second concatenated embedding representing a second vehicle and its attributes. In some embodiments, embedding database 210 may also store resultant similarity metrics in database 210 to further reduce redundant processing usage.

Attribute selector 215 selects attributes for generating numerical representations for recommending similar vehicles. In some embodiments, attribute selector 215 selects vehicle attributes for input into neural network 225, which generates vehicle attribute value embeddings used to determine vehicles with similar attributes. For example, attribute selector 215 selects a subset of ten vehicle attributes from a set of fifty available vehicle attributes, and inputs vehicle attribute values of the ten vehicle attributes into neural network 225. In some embodiments, attribute selector 215 selects a subset of attributes from attribute database 200 based on mutual information (e.g., accessed from correlation information database 205) of the attributes in database 200 and a target attribute.

Attribute selector 215 may use a default attribute as a target attribute. For example, the target attribute may be a valuation amount of a vehicle by default. Attribute selector 215 may determine mutual information between a vehicle's valuation amount and other vehicle attributes in attribute database 200. Attribute selector 215 may store the determined mutual information in correlation information database 205. The vehicle attributes may be ranked according to their mutual information with a valuation amount and attribute selector 215 may select a predefined number of attributes (e.g., top 3) that have the highest mutual information. In some embodiments, the target attribute may be user-specified. For example, the user may specify that vehicle recommendations may be made upon popularity (e.g., a frequency at which vehicles are acquired by users). Vehicle recommendation system 140 may determine mutual information between a vehicle attribute and the vehicle's popularity. For example, attributor selector 215 determines that the three attributes having highest mutual information with vehicle popularity are color, body style, and fuel type. The three attributes may then be input into neural network 225 or used to query embedding database 210 to determine corresponding embeddings for the values of the three attributes.

Training engine 220 trains neural network 225 to receive an input vector of vehicle attribute values and output an embedding representing the input values. The input vector may have a first dimension that is greater than the dimension of the output embedding. That is, training engine 220 trains neural network 225 to reduce the dimensionality of input vectors, which provides an advantage during subsequent calculations involving the embeddings. As the dimensions of the embeddings becomes smaller, the less processing resources may be needed for an operation (e.g., determining the cosine similarity between embeddings). Training engine 220 can balance dimension reduction with the representation accuracy of the embedding using an error metric. In some embodiments, training engine 220 minimizes a loss function of neural network 225 by adjusting a dimension of a hidden layer of neural network 225. Alternatively or additionally, training engine 220 may minimize a loss function of neural network 225 by adjusting weights of nodes of hidden layers of neural network 225. In some embodiments, training engine 220 uses an error metric of a mean additive error. For example, training engine 220 may determine that a loss function of neural network 225 is minimized when a mean additive error of a valuation amount of a recommended vehicle output by neural network 225 and a valuation amount of a user-specified vehicle is below a threshold error.

Dimension reduction or weight modification may be performed during initial training of neural network 225 or during re-training of neural network 225. In some embodiments, training engine 220 may receive user feedback which triggers the re-training of neural network 225. For example, a user may provide, via a GUI on client device 130, a measure of approval indicating dissatisfaction with the vehicle recommendations made by vehicle recommendation system 140, and in response, training engine 220 may re-train neural network 225 such that the unsatisfactory vehicle recommendations are less likely to reappear when a user specifies similar vehicle characteristics that led to the unsatisfactory recommendations. In some embodiments, training engine 220 re-trains neural network 225 periodically. For example, attribute database 200 may be updated periodically when a manufacturer provides updated or new vehicle attributes (e.g., a new vehicle is released) and inventory training engine 220 re-trains neural network 225 with the updated attribute values in database 200.

Neural network 225 generates embeddings for vehicle attribute values. For example, neural network 225 may generate embeddings using vehicle attribute values of an inventory of vehicles available for acquisition by a user (e.g., in a vehicle dealership). Neural network 225 includes various layers such as hidden layers, where each hidden layer includes hidden nodes. Neural network 225 may be trained by training engine 220. For example, training engine 220 determines weights associated with connections between the hidden nodes to minimize a loss function such that embeddings generated by neural network 225 are representative of similar valuation amounts (e.g., the embeddings correspond to vehicles that are ±1,000 dollars from a user's desired valuation amount) for attributes mapped to an embedding. Vehicle recommendation system 140 may store embeddings generated by neural network 225 in embedding database 210. Neural network 225 is further described in the description of FIG. 3. Example processes for generating embeddings using attributes are described in the descriptions of FIGS. 4 and 6.

Concatenator 230 concatenates embeddings representing respective vehicle attribute values. Embeddings may be in vector or matrix form, and concatenator 230 performs either a row or column concatenation of the embeddings. For example, neural network 225 may output an embedding for a vehicle color attribute (e.g., white)and another embedding for a vehicle year attribute (e.g., 2017). Concatenator 230 may create a concatenation of these two embeddings such that the concatenated embedding represents both vehicle year and color. Concatenator 230 may use a predefined vector or matrix format to determine how to perform the concatenation. For example, embeddings may be formatted (e.g., by default) to have certain row or column entries correspond to particular vehicle attributes. The concatenator may determine one or more vehicle attributes included within one or more embeddings output by neural network 225 and concatenate the embeddings based on the embeddings' corresponding vehicle attributes. In this way, the embeddings are concatenated to a format that is standardized for comparison by embedding similarity module 235.

Embedding similarity module 235 determines similarity metrics between embeddings or concatenated embeddings. Embedding similarity module 235 may receive a concatenated embedding from concatenator 230, neural network 225, or an embedding from embedding database 210. In some embodiments, module 235 compares this received embedding to reference (e.g., pre-generated) embeddings to determine the similarity between the received embedding and other embeddings. For example, module 235 accesses pre-generated embeddings in embedding database 210 to compare against an embedding received from concatenator 230. The comparison may include determining similarity through cosine similarity, Euclidean distance, dot products, Manhattan length, Minkowski distance, Jaccard similarity, any suitable vector similarity calculation, or a combination thereof. Example processes for generating similarity metrics for vehicle recommendations are described further in the descriptions of FIGS. 4-5.

The similarity metrics determined by embedding similarity module 235 may each be representative of a measure of similarity between a vehicle specified by a user (e.g., via a characteristic of the vehicle) and a given vehicle. For example, the cosine similarity of an embedding representative of a vehicle having a particular VIN specified by the user (e.g., through user device 130) and an embedding representative of another vehicle may indicate that the two vehicles are similar due to their price range, vehicle attributes, popularity, or any other suitable quality with which a comparison may be made.

Figure 7:
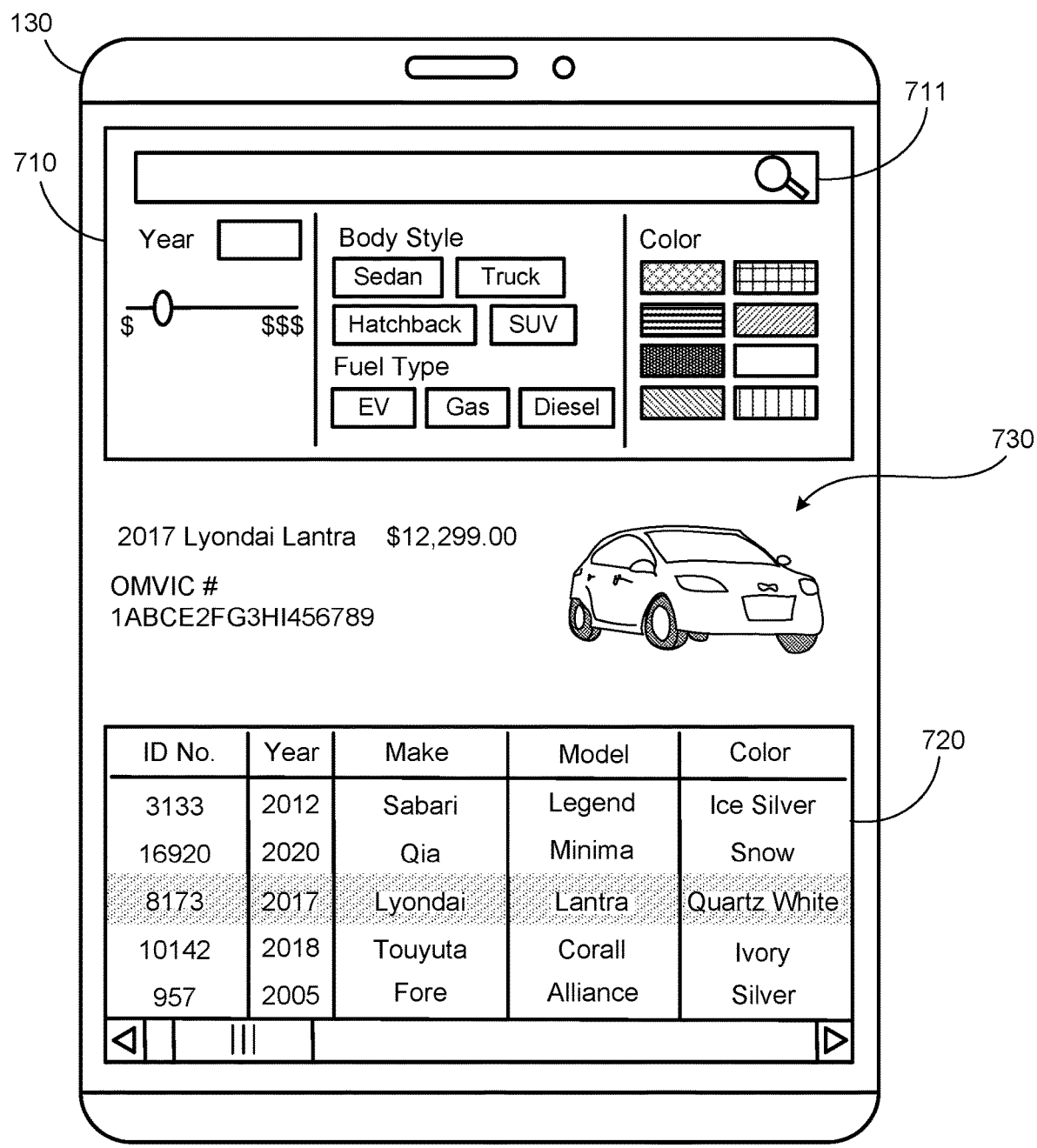
FIG. 7 depicts a graphical user interface (GUI) for vehicle desking, in accordance with at least one embodiment.

GUI module 240 provides for display GUIs through which a user can manage or use the functions of vehicle recommendation system 140. For example, a user can provide feedback of the vehicle recommendations made by vehicle recommendation system 140 through a GUI provided for display by GUI module 240. To provide a GUI for display, GUI module 240 may host documents (e.g., HyperText Markup Language (HTML) documents) and transmit them to a web browser or application of the user device 130 that generates the GUI at the device 130. In some embodiments, GUI module 240 generates for display a GUI on a computing device (e.g., user device 130) that hosts vehicle recommendation system 140 or is communicatively coupled to remote vehicle recommendation system 110. GUI module 240 may provide an interactive user interface that includes various buttons, toggles, menus, etc. through which a user can query vehicles and specify parameters for querying the vehicles. FIG. 7 shows an example GUI that may be generated by GUI module 240.

GUI module 240 may receive a request to determine similarities between vehicles. In some embodiments, the request indicates an identifier of a user-specified vehicle that is associated with vehicle attribute values. For example, a user of user device 130 uses a GUI to specify an identifier of a vehicle, where this specification is received by GUI module 240. The user may specify an identifier to request vehicles with attributes related to a particular vehicle based on a target vehicle attribute. While the user can specify an identifier such as a VIN or license plate, the user may also specify vehicle attributes such as a make, model, body style, or fuel type.

GUI module 240 may display identifiers of one or more vehicles ranked based on similarity metrics determined by embedding similarity module 235. Identifiers may include entries in a list or chart, where each entry includes vehicle attribute values of a particular vehicle. GUI module 240 may display a predefined number of identifiers. For example, GUI module 240 provides for display a table listing the top ten most similar vehicles to the user-specified vehicle. GUI module 240 may receive user input interacting with the displayed identifiers. For example, the user may select an identifier to request more information be displayed about the corresponding vehicle. In another example, the user may filter or sort identifiers after specify a parameter with which the entries will be filtered (e.g., a year of manufacture) or sorted (e.g., by lowest to highest valuation amount).

Vehicle Recommendation System Models and Applications

Figure 3:
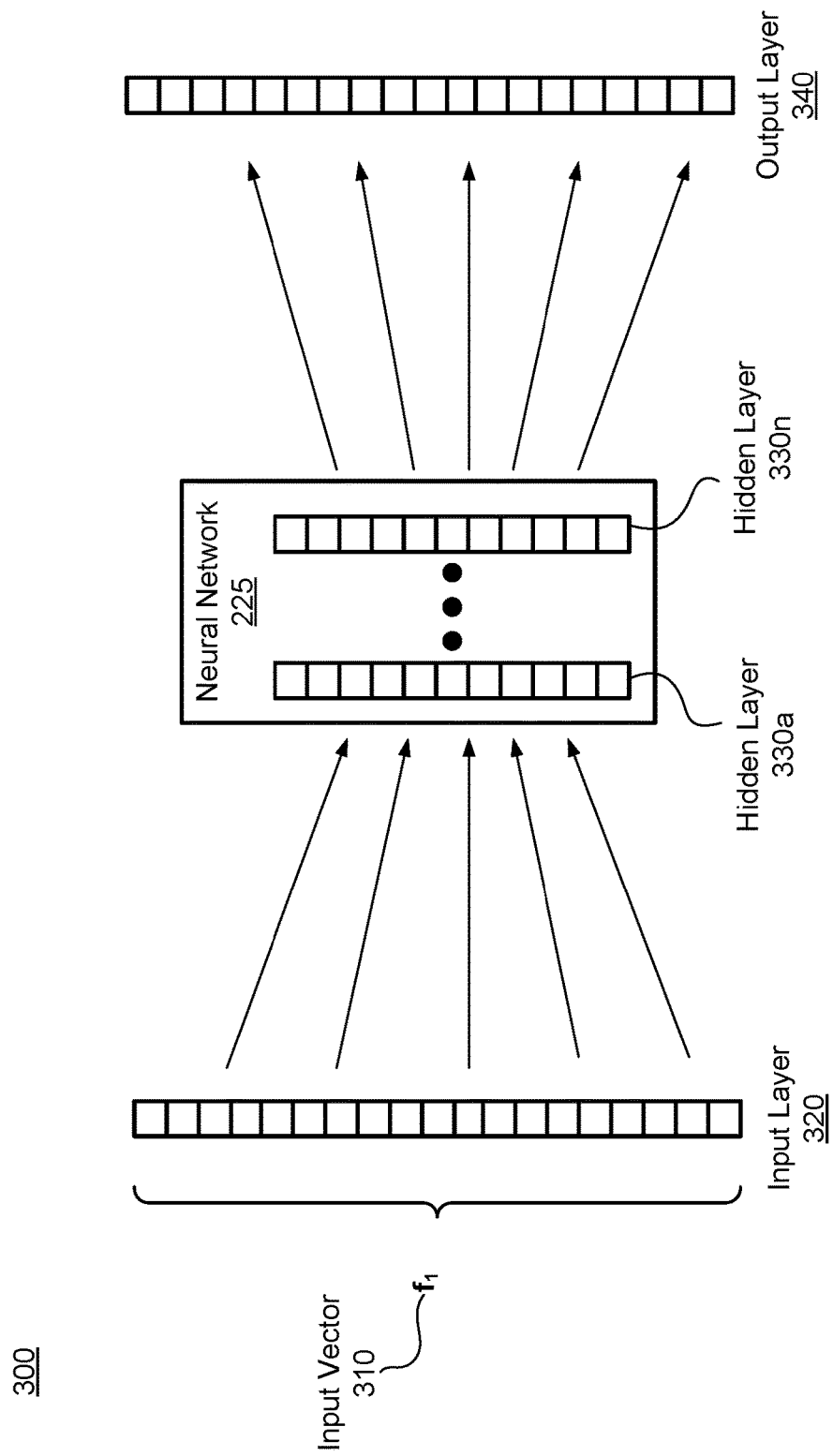
FIG. 3 shows a diagram of an example neural network maintained by a vehicle recommendation system, in accordance with at least one embodiment.

FIG. 3 shows diagram 300 of example neural network 225 maintained by a vehicle recommendation system, in accordance with at least one embodiment. Neural network 225 includes input layer 320, one or more hidden layers 330a-n, and output layer 340. Each layer of neural network 225 (i.e., input layer 320, output layer 340, and hidden layers 330a-n) comprises a set of nodes such that the set of nodes of input layer 320 are input nodes of neural network 225, the set of nodes of output layer 340 are output nodes of neural network 225, and the set of nodes of each of hidden layers 330a-n are hidden nodes of neural network 225. Generally, nodes of a layer may provide input to another layer and may receive input from another layer. Nodes of each hidden layer are associated with two layers, a previous layer, and a next layer. The hidden layer receives the output of the previous layer as input and provides the output generated by the hidden layer as input to the next layer.

Each node has one or more inputs and one or more outputs. Each of the one or more inputs to a node comprises a connection to an adjacent node in a previous layer and an output of a node comprises a connection to each of the one or more nodes in a next layer. That is, each of the one or more outputs of the node is an input to a node in the next layer such that each of the node is connected to every node in the next layer via its output and is connected to every node in the previous layer via its input. Here, the output of a node is defined by an activation function that applies a set of weights to the inputs of the nodes of neural network 225. Example activation functions include an identity function, a binary step function, a logistic function, a TanH function, an ArcTan function, a rectilinear function, or any combination thereof. Generally, an activation function is any non-linear function capable of providing a smooth transition in the output of a neuron as the one or more input values of a neuron change. In various embodiments, the output of a node is associated with a set of instructions corresponding to the computation performed by the node. Here, the set of instructions corresponding to the plurality of nodes of the neural network may be executed by one or more computer processors.

In one embodiment, input vector 310 is a vector comprising attributes associated with a vehicle that can be analyzed by vehicle recommendation system 140 (e.g., a vehicle specified by a user who is requesting similar vehicles). For example, input vector 310 comprises vehicle construction information, vehicle operation information, vehicle performance, identification information, and appearance information, or any combination thereof.

Neural network 225 generates a numerical vector representation of input vector 310, where this numerical vector representation is referred to as an embedding. Each of the hidden layers 330a-330n of neural network 225 also generates intermediate embeddings. The embeddings are a representation of the input vector mapped to a latent space. The latent space may be a compressed representation of the vehicle attribute values of input vector 320. The connections between nodes in neural network 225 each include a weight. In one or more embodiments, training neural network 225 comprises adjusting values for weights of neural network 225 to minimize or reduce a loss function associated with neural network 225. Neural network 225 may be re-trained using user feedback or the loss function, where the re-training modifies the dimension of the latent space or the values of weights in neural network 225.

In one embodiment, input vector 310 includes vehicle attributes of a color and a make. The term "vector" as used herein is not necessarily limited to a representation of either one column or one row, and may also refer to a matrix having both more than one column and row unless implied otherwise by context. Input vector 310 may include two columns for each vehicle attribute and various rows for unique values of the respective attributes. For example, input vector 310 includes ten unique vehicle make values and twenty unique color values; thus, thirty vehicle attribute values are input into neural network 225. Neural network 225 may modify (e.g., reduce) the dimension of input vector 310 as it provides data from one layer to the next. For example, neural network 225 may reduce the twenty unique vehicle color values to ten unique values, which may not necessarily be ten values of the twenty values. Neural network 225 can reduce the dimensions to achieve a reduced number of representative values such that similar colors become closer in a numerical representation. Neural network 225 can learn an embedding for every color and an embedding for every make. Vehicle recommendation system 140 may determine to train neural network 225 until neural network 225 reaches a predetermined number of layers (e.g., the number of layers including the input, output, and hidden layers) or a predetermined embedding dimension.

Although two vehicle attributes were used in the previous example embodiment, more or less vehicle attributes may be selected by vehicle recommendation system 140 for input into neural network 225. Training engine 220 of vehicle recommendation system 140 may determine which vehicle attributes are input into neural network 225 using attribute selector 215, user feedback, a loss function, or combination thereof. For example, attribute selector 215 may perform an attribute selection to choose vehicle attributes that have high mutual information with a valuation amount (e.g., a price) of the vehicle. Vehicle recommendation system 140 can iteratively select attributes, apply neural network 225 to the selected attributes, and determine an error metric until the error metric or trend in iteratively determined error metrics meets a predetermined criterion. For example, vehicle recommendation system 140 can select a different set of vehicle attributes, apply neural network 225 to the different set of vehicle attributes, determine a corresponding error metric, and determine a difference between the two error metrics. Vehicle recommendation system 140 may determine that the difference is less than a threshold error difference (e.g., increased by 4% mean additive error, which is less than a threshold error difference of 5% mean additive error).

Figure 4:
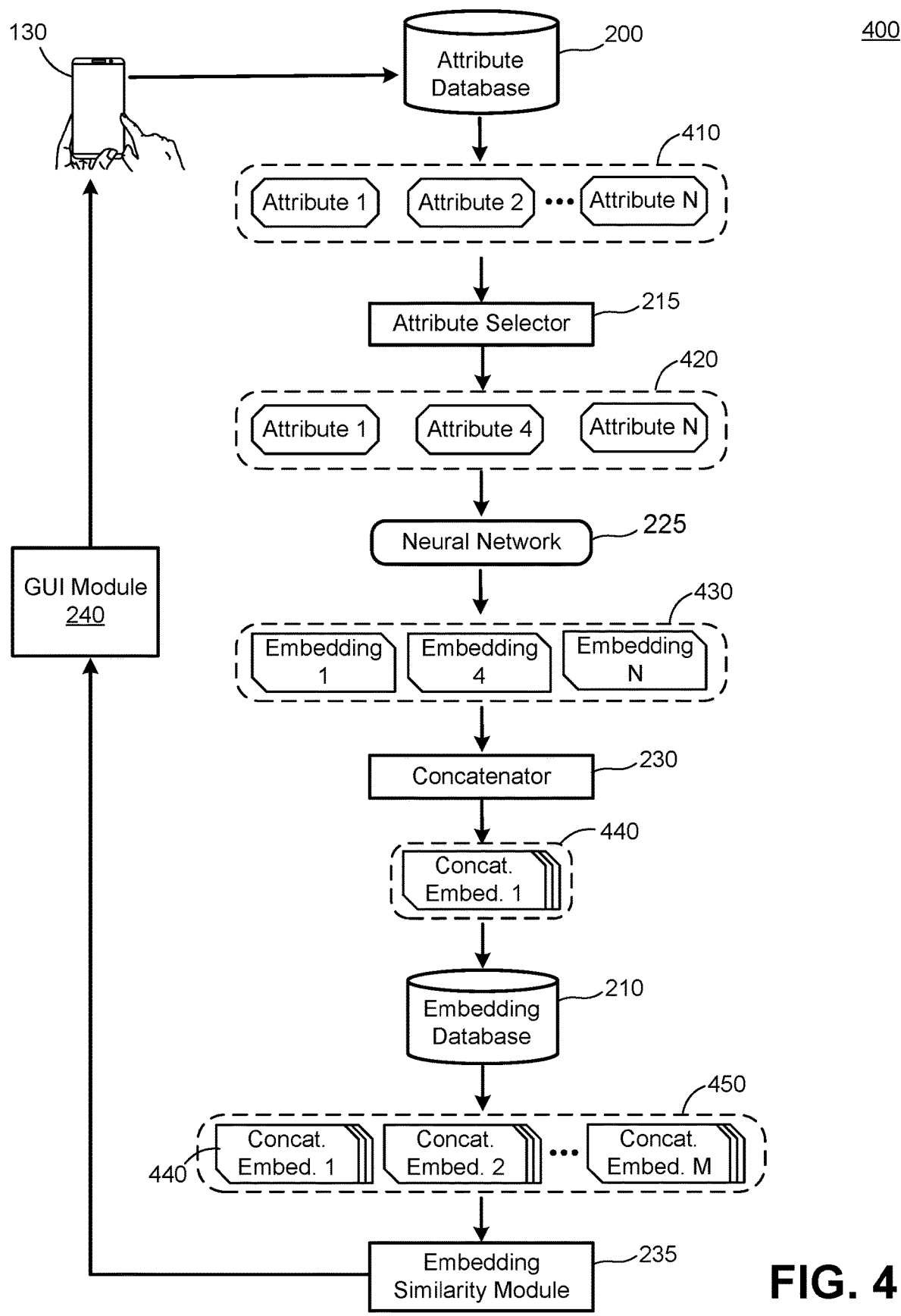
FIG. 4 is a diagram illustrating a process for determining a vehicle recommendation based on a user-specified vehicle identifier, in accordance with at least one embodiment.

FIG. 4 is a diagram illustrating process 400 for determining a vehicle recommendation based on a user-specified vehicle identifier, in accordance with at least one embodiment. A vehicle recommendation system described herein (e.g., vehicle recommendation system 140) performs process 400. A user may request that vehicle recommendation system 140 determine vehicles similar to the vehicle specified by the identifier (e.g., a VIN). The identifier may indicate one or more vehicle attributes, which are used by neural network 225 to determine embeddings that numerically represent the vehicle attributes. The embeddings are concatenated by concatenator 230 to be compared against other embeddings. Similarity metrics from this comparison are used to determine which vehicles to display to the user to fulfill their request.

Process 400 may begin with vehicle recommendation system 140 receiving a request from user device 130 to determine similarities between vehicles. The user's request may indicate an attribute of a vehicle for which the user is requesting similar vehicles. Vehicle recommendation system 140 queries attribute database 200 using information provided in the user's request. For example, the request may include a vehicle identifier such as a VIN or license plate number. Vehicle recommendation system 140 may query attribute database 200 with a vehicle's VIN and in turn, attribute database 200 may provide vehicle attributes 410 of the vehicle such as a valuation amount, fuel type, make, model, color, body style, and safety features. Through this association that enables lookup in database 200, an identifier can indicate one or more attributes of a vehicle. Although not depicted, vehicle recommendation system 140 may bypass accessing attribute database 200 depending on the information provided in the user's request. For example, the user's request may specify vehicle attributes and values, and vehicle recommendation system 140 may provide directly to providing the attributes to attribute selector 215.

Attribute selector 215 receives vehicle attributes 410 and selects subset 420 of attributes of the set of attributes 410 for input into neural network 225. As depicted, N vehicle attributes are filtered down to three attributes by attribute selector 215. Attribute selector 215 may select subset 420 using correlation metrics such as mutual information (e.g., as accessible in correlation information database 225) between vehicle attributes and a target attribute. This is further described in the description of correlation information database 225. Neural network 225 generates embeddings 430 corresponding to attributes of subset 420. Concatenator 230 concatenates embeddings 430 to generate concatenated embedding 440. Vehicle recommendation system 140 can store embedding 440 into embedding database 210. Storage may be optional although vehicle recommendation system 140 is depicted in FIG. 4 as storing embedding 440 into embedding database 210. Embedding similarity module 235 determines similarity metrics for embeddings 450, which include embedding 440 and other embeddings accessed from embedding database 210. Each of the embeddings 450 may represent attributes of respective vehicles. GUI module 240 uses the determined similarity metrics to provide identifiers of vehicles corresponding to embeddings from embeddings 450 for display at user device 130.

In one example, a user specifies a VIN of a vehicle that has attributes such as a color of "white," body type of "four door sedan," fuel type of "gas," valuation amount of 20,000 dollars, safety attributes of air bags and lane guidance assistance, and six second acceleration time from 0 to 60 miles per hour. Vehicle recommendation system 140 uses the VIN to look up these vehicle attributes in attribute database 200. The queried attributes correspond to attributes 410, which are provided to attribute selector 215. Attribute selector 215 may use a target attribute such as valuation amount or popularity to filter attributes from attributes 410. Popularity may be determined from historical records of vehicle acquisitions (e.g., vehicle purchase metrics provided by vehicle dealerships) and derived from the frequency at which particular vehicles are acquired. Attribute selector 215 may select subset 420 of attributes that includes color, fuel type, and body style after determining that the mutual information is highest between these three attributes and the target attribute. Neural network 225 creates embeddings 430 for the three attributes of subset 420.

Process 400 can then turn to concatenator 230, which concatenates embeddings 430 into embedding 440 that represents the attributes of color, fuel type, and body style of the user's specified vehicle in a single numerical representation. Vehicle recommendation system 140 may store embedding 440 in embedding database 210, from where embedding similarity module 235 accesses embedding 440 along with embeddings of other vehicles, which are collectively embeddings 450. Embedding similarity module 235 determines similarity metrics between embedding 440 and other embeddings in embeddings 450, where each similarity metric represents a measure of similarity (e.g., cosine similarity) between the user-specified vehicle and another vehicle. GUI module 240 provides identifiers of vehicles similar to the user-specified vehicle. For example, GUI module 240 provides a chart listing the vehicles and corresponding attributes by their similarity metric with the user-specified vehicle. In another example, GUI module 240 provides a chart listing the top ten, or any other suitable number, vehicles and their corresponding attributes.

Figure 5:
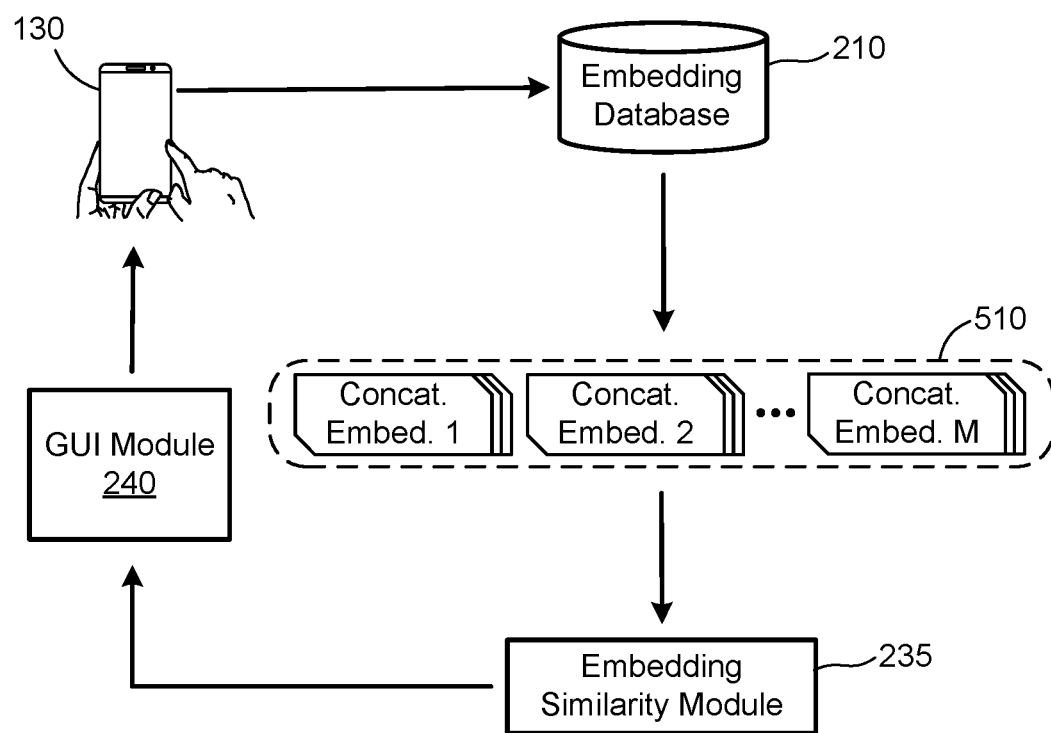
FIG. 5 is a diagram illustrating a process for determining a vehicle recommendation using generated neural network embeddings, in accordance with at least one embodiment.

FIG. 5 is a diagram illustrating process 500 for determining a vehicle recommendation using generated neural network embeddings, in accordance with at least one embodiment. A vehicle recommendation system described herein (e.g., vehicle recommendation system 140) performs process 500. To provide vehicle recommendations, vehicle recommendation system 140 can leverage pre-generated neural network embeddings. For example, embedding database 210 can store embeddings generated by neural network 225. The embeddings can be stored in a data structure such that each embedding is linked to a respective identifier. This enables modules within vehicle recommendation system 140 to query for the embeddings using identifiers. An identifier can be a VIN, license plate, or any other suitable unique identifier of a vehicle.

In one embodiment, process 500 begins with vehicle recommendation system 140 receiving an identifier from user device 130. Vehicle recommendation system 140 uses the identifier to query embedding database 210. If an embedding has already been generated for the vehicle (e.g., by neural network 225), embedding similarity module 235 may determine similarity metrics for the pre-generated embedding. Otherwise, if an embedding for the vehicle identified by the identifier has not yet been generated, vehicle recommendation system 140 may proceed to generate the embedding using neural network 225 (e.g., as described in process 400 of FIG. 4). Embedding similarity module 235 receives concatenated embeddings 510, which include the pre-generated embedding, from embedding database 200 and computes similarity metrics indicative of the similarity between the user-specified vehicle and other vehicles represented by embeddings in embedding database 210. GUI module 240 may then provide for display identifiers for embeddings of vehicles similar to the user-specified vehicle (e.g., vehicle information corresponding to the ten embeddings having the highest cosine similarity with the pre-generated embedding of the user-specified vehicle).

Figure 6:
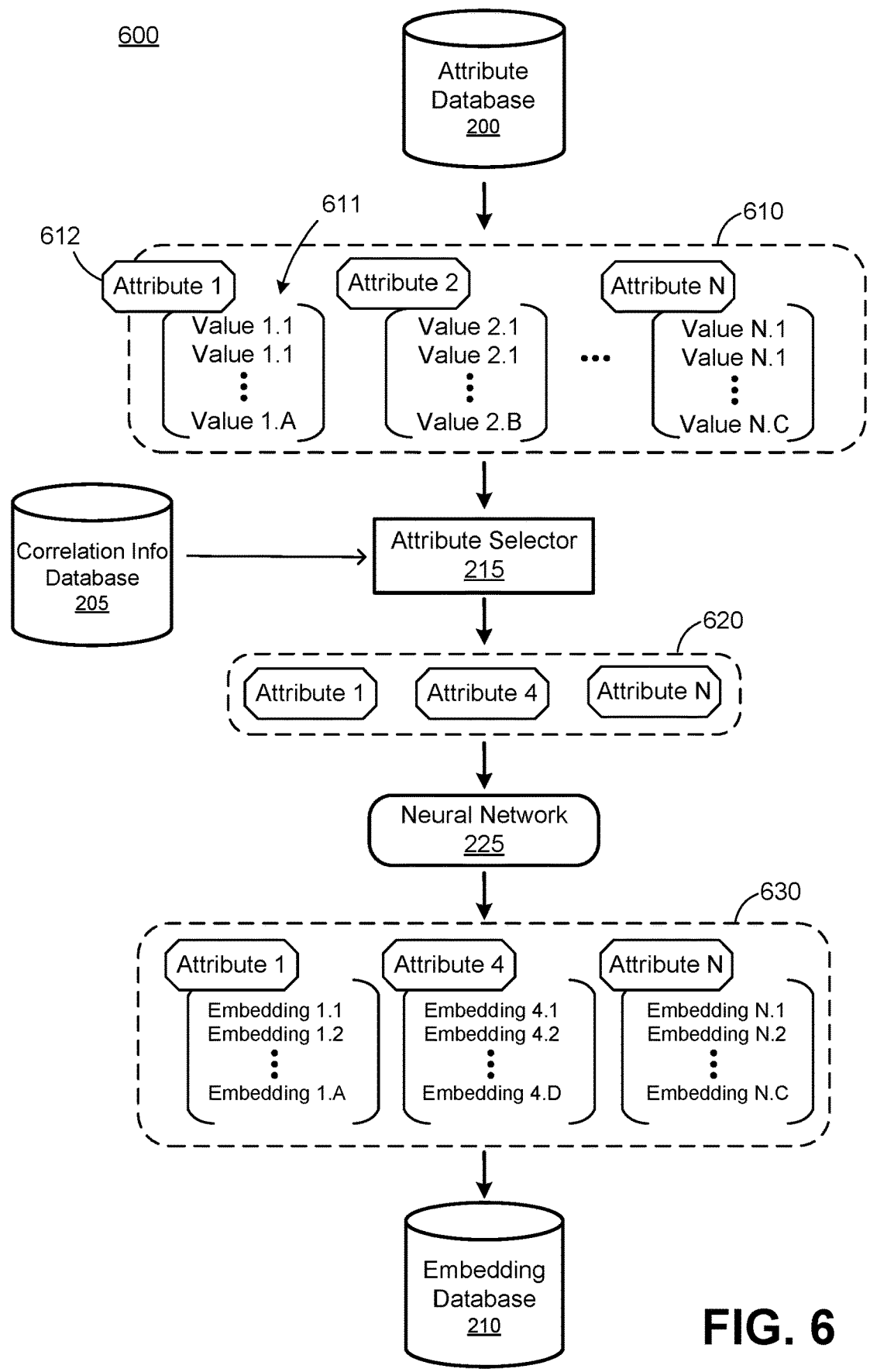
FIG. 6 is a diagram illustrating a process for generating a neural network embedding for vehicle desking, in accordance with at least one embodiment.

FIG. 6 is a diagram illustrating process 600 for generating neural network embeddings 630 for vehicle desking, in accordance with at least one embodiment. Vehicle recommendation system 140 may generate embeddings before a user submits a request for vehicle recommendations. For example, the user specifies a VIN of a desired vehicle, and vehicle recommendation system 140 has pre-generated an embedding for the vehicle using process 600. In this way, vehicle recommendation system 140 reduces the resource consumption (e.g., power and processing) that may otherwise be needed for on demand embedding creation.

Vehicle recommendation system 140 may receive vehicle attributes and values from third parties such as vehicle manufacturers, vehicle suppliers, regulatory agencies (e.g., the National Highway Traffic Safety Administration of the U.S. federal government), or any suitable third party provider of information related to vehicle attributes. Vehicle recommendation system 140 stores the received vehicle attributes and values in attribute database 200 (e.g., as attribute-value pairs). Vehicle recommendation system 140 may access vehicle attributes and values 610 from attribute database 200 for input into attribute selector 215. Vehicle attributes and values 610 include attributes and for each attribute, one or more values. For example, vehicle attribute 612 may be the attribute of vehicle color and have values 611 corresponding to colors such as red, garnet, crimson, yellow, topaz, lemon, or any other suitable color or naming (e.g., as named by a vehicle manufacturer). The values may be a numeric representation of the vehicle attribute or information related to the vehicle attribute. For example, one of values 611 (e.g., Value 1.1) for a color may include an RGB value for the color, a number of vehicles sold within the last month having the color, and a binary flag indicating whether the color is a limited edition color. Similarly, other values 611 (e.g., Value 1.2 through 1.A) for other colors may include similar RGB, vehicle sales, and edition information. Attributes 2-N may be for different vehicle attributes such as make, model, year, safety features, etc. and these attributes may likewise be associated with respective sets of values of the attributes.

Attribute selector 215 retrieves correlation metrics from correlation information database 205 and selects subset 620 of attributes 610 using the retrieved correlation metrics (e.g., mutual information). Attribute selector 215 may retrieve mutual information based on a user input specifying a target attribute. For example, a user specifies a target attribute of a valuation amount (e.g., price), and attribute selector 215 retrieves mutual information between each attribute and the valuation amount. Subset 620 of attributes may thus be the attributes of attributes 610 that are relatively more relevant to a valuation amount. Attribute selector 215 may determine a number of attributes to select based on a default or user-specified number or based on a conditional decision to select each attribute meeting a threshold mutual information value. Although not depicted to promote clarity within the figure, each of the attributes in subset 620 are associated with respective values (e.g., as shown in attributes and values 610) that are input into neural network 225. Furthermore, process 600 is depicted as including an attribute selector, which provides a benefit of reducing computation at neural network 225 that might otherwise compute embeddings for every attribute value. However, in alternative embodiments, attribute selector 215 may be bypassed and embeddings computed for every attribute value stored in database 200.

Neural network 225 determines embeddings 630 for each of the attribute values in subset 620. Vehicle recommendation system 140 stores embeddings 630 into embedding database 210. Following process 600, the embeddings may be provided to concatenator 230 to create a concatenated embedding of a vehicle specified by a user. For example, vehicle recommendation system 140 receives a user request including a VIN of a vehicle, queries attributes of the vehicle from attribute database 200, queries embeddings for each of the individual attributes from embedding database 210, and provides them to concatenator 230 to create a concatenated embedding for subsequent similarity determinations.

Example Vehicle Recommendation System Interface

FIG. 7 depicts a graphical user interface (GUI) for vehicle desking, in accordance with at least one embodiment. Vehicle recommendation system 140 may provide interface 700 for display on user devices (e.g., user device 130). Interface 700 includes vehicle attribute search panel 710, vehicle summary panel 730, and desking result table 720. Search panel 710 further includes user input element 711. A user may request that vehicle recommendation system 140 determine similarities between vehicles using interface 700. In one embodiment, a user inputs a VIN into user input element 711. Vehicle recommendation system 140 receives the request and the user-indicated identifier (i.e., the VIN) and determines vehicles similar to the vehicle specified by the VIN. Examples of such determinations made by vehicle recommendation system 140 are described in the descriptions of FIGS. 2, 4, and 5. In another embodiment, a user specifies vehicle attribute values using various toggles and selection buttons in search panel 710 (e.g., manufacture year, valuation amount or range, body style, fuel type, color, etc.).

The results of the determination of similar vehicles to the user-specified vehicle or vehicle attributes are provided for display by vehicle recommendation system 140 in desking result table 720. For example, a user specifies vehicle attributes of a white color, a sedan body type, and a 20,000 valuation amount. Vehicle recommendation system 140 provides for display table 720 of entries, each entry corresponding to a similar vehicle, where similarity may be relevant to a target attribute such as acquisition history or valuation amount. Vehicle recommendation system 140 may determine that a silver-colored vehicle is more similar to the user's specified attributes, despite "white" being specified, because the silver-colored vehicle has a valuation amount similar to the user-specified valuation amount or because silver cars were acquired by users who had also acquired white-colored cars.

The GUI elements of interface 700 may be interactive. For example, GUI module 240 may enable a user to sort, filter, or select entries within desking result table 720. A user may select the entry for a vehicle of make "Lyondai," where the selection is depicted through shading in table 720, and the selection may cause GUI module 240 to display more information regarding the vehicle in vehicle summary panel 730. In one example, the GUI of FIG. 7 may be part of a larger vehicle desking application that includes the vehicle recommendation system described herein. In another example, the GUI may be part of a website for a vehicle dealership or OEM. In this example, a user can select a vehicle on the website and in response, the vehicle recommendation system can determine and display its recommendation of similar vehicles. In some embodiments, a GUI element for displaying vehicle recommendations may be a chatbot. A user may specify a vehicle in an input field of the chatbot and GUI module 240 may cause the recommended vehicles to be displayed in a messaging thread of the chatbot.

Computing Machine Architecture

FIG. 8 is a block diagram illustrating components of an example machine able to read instructions from a machine-readable medium and execute them in a processor (or controller). Specifically, FIG. 8 shows a diagrammatic representation of a machine in the example form of a computer system 800 within which program code (e.g., software) for causing the machine to perform any one or more of the methodologies discussed herein may be executed. The program code may be comprised of instructions 824 executable by one or more processors 802. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 800 includes a processor 802 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 804, and a static memory 806, which are configured to communicate with each other via a bus 808. The computer system 800 may further include visual display interface 810. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 810 may include or may interface with a touch enabled screen. The computer system 800 may also include alphanumeric input device 812 (e.g., a keyboard or touch screen keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. The instructions 824 (e.g., software) may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 (e.g., software) may be transmitted or received over a network 826 via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store instructions (e.g., instructions 824). The term "machine-readable medium" shall also be taken to include any medium that is capable of storing instructions (e.g., instructions 824) for execution by the machine and that cause the machine to perform any one or more of the methodologies disclosed herein. The term "machine-readable medium" includes, but not be limited to, data repositories in the form of solid-state memories, optical media, and magnetic media.

Processes for Vehicle Recommendations in a Vehicle Recommendation System

Figure 9:
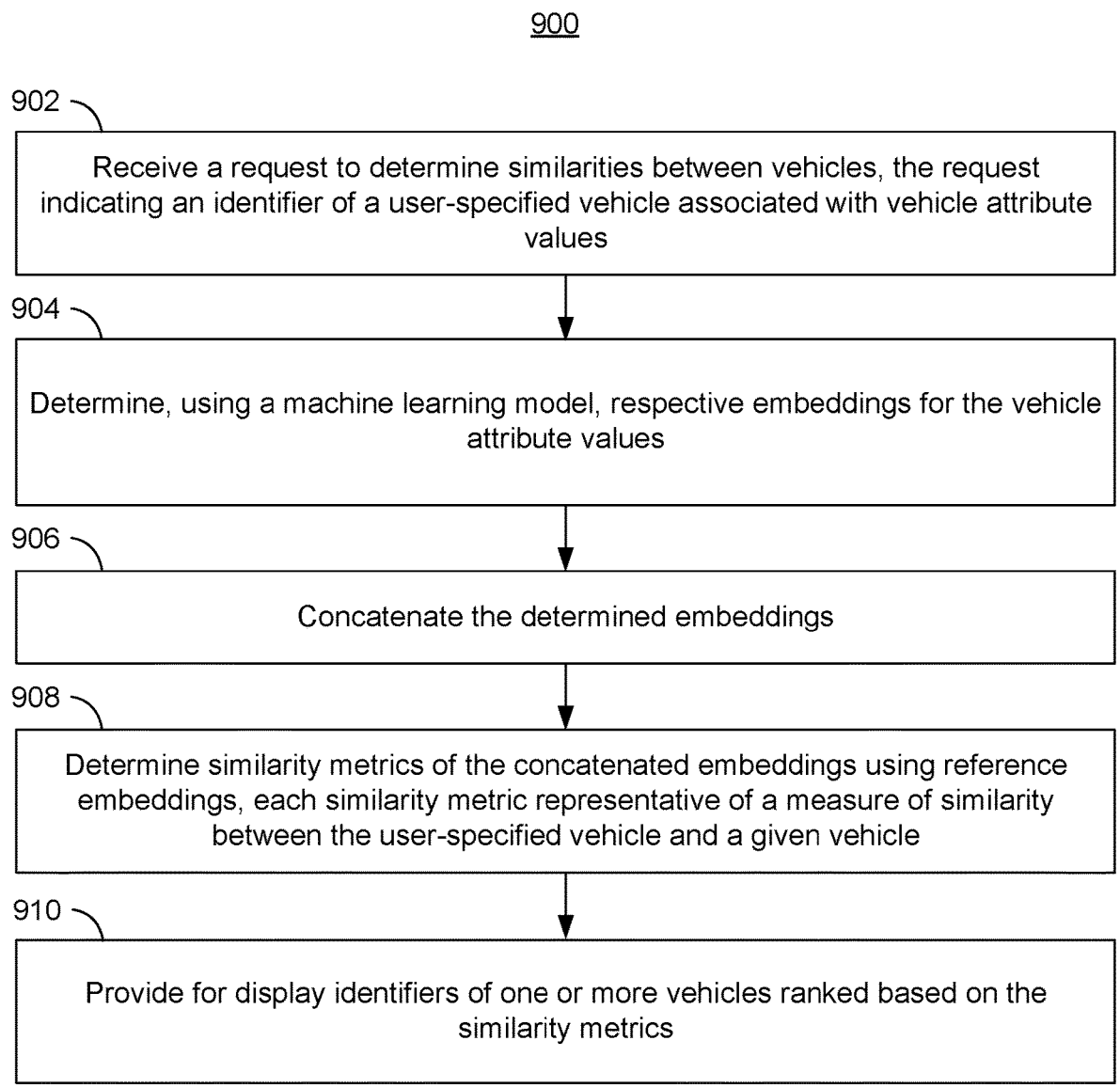
FIG. 9 is a flowchart illustrating a process for providing vehicle recommendations, in accordance with at least one embodiment.

FIG. 9 is a flowchart illustrating a process for providing vehicle recommendations, in accordance with at least one embodiment. Vehicle recommendation system 140 may perform process 900. In some embodiments, vehicle recommendation system 140 performs operations of process 900 in parallel or in different orders, or may perform different steps.

Vehicle recommendation system 140 receives 902 a request to determine similarities between vehicles, the request indicating an identifier of a user-specified vehicle associated with vehicle attribute values. For example, vehicle recommendation system 140 receives user input at user device 130, where the user may be a client looking to acquire a vehicle or an employee of a vehicle dealership that is looking to help the client acquire a vehicle from the dealership. Either user may request to find vehicles similar to a particular vehicle or vehicle attributes. For example, the employee may receive a desired budget and vehicle make and model from the client, which the employee then specifies to vehicle recommendation system 140 through user device 130. For example, the employee transmits a request to vehicle recommendation system 140 that includes an identification number for the type of car identified by the make and model specified (e.g., the first three digits of a VIN, which correspond to the world manufacturer identifier).

Vehicle recommendation system 140 determines 904, using a machine learning model (e.g., a neural network), respective embeddings for the vehicle attribute values. In some embodiments, vehicle recommendation system 140 queries embedding database 210 for pre-generated embeddings for vehicle attribute values related to the client's request. For example, vehicle recommendation system 140 queries database 210 with the world manufacturer identifier associated with a Japanese manufacturer of sedans and receives embeddings for vehicle attributes of that manufacturer's sedans, where the embeddings were pre-generated by neural network 225. Alternatively, vehicle recommendation system 140 may query attribute database 200 to determine vehicle attribute values linked to a world manufacturer identifier. For example, vehicle recommendation system 140 queries database 200 with the world manufacturer identifier associated with a Japanese manufacturer of sedans and receives vehicle attributes related to sedans manufactured by the Japanese manufacturer. Vehicle recommendation system 140 may use attribute selector 215 to filter which attributes and values are input into neural network 225 or directly input the attributes received from database 200 into neural network 225. Embeddings for the vehicle attributes related to sedans manufactured by the Japanese manufacturer are output from neural network 225.

Vehicle recommendation system 140 concatenates 906 the determined embeddings. Concatenator 230 may concatenate embeddings corresponding to vehicle attributes of the Japanese manufacturer of sedans. For example, the non-concatenated embeddings represent individual attributes of the transmission system (e.g., all-wheel drive), fuel economy, and safety features. Concatenator 230 generates a concatenated embedding. In some embodiments, where there are multiple values for a vehicle attribute and thus, multiple embeddings for an attribute, concatenator 230 may select one embedding per attribute to concatenate.

Vehicle recommendation system 140 determines 908 similarity metrics of the concatenated embeddings using reference (e.g., pre-generated) embeddings, each similarity metric representative of a measure of similarity between the user-specified vehicle and a given vehicle. For example, embedding similarity module 235 may determine a cosine similarity of the concatenated embedding and other concatenated embeddings in embedding database 210. Each determined cosine similarity value may be a similarity metric, which may be used to determine which identifiers to provide 910 and indicate which vehicles are the most similar to the client's specified make and model.

Vehicle recommendation system 140 provides 910 for display identifiers of one or more vehicles ranked based on the similarity metrics. Vehicle recommendation system 140 may use the determined 908 similarity metrics to rank embeddings from embedding database 210 according to their similarity with the embedding associated with the client's specified make and model. Vehicle recommendation system 140 may further filter which identifiers are provided 910 for display using the client's specified budget or valuation amount. For example, vehicle recommendation system 140 provides 910 for display identifiers for vehicles whose embeddings have a high ranked similarity metric (e.g., twenty highest embeddings) and whose valuation amounts do not exceed the client's specified valuation amount. Thus, vehicle recommendation system 140 provides a recommendation for similar vehicles that can also meet a client's budget.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives.

It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for operating a data management system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable medium comprising memory with instructions encoded thereon, the instructions, when executed, causing one or more processors to perform operations, the instructions comprising instructions to:
   receive a request to determine similarities between candidate vehicles and a user-specified vehicle associated with a plurality of vehicle attributes corresponding to a plurality of vehicle attribute values;
   calculate a conditional probability between a vehicle attribute of the plurality of vehicle attributes and a valuation amount of the vehicle attribute;
   select a subset of the plurality of vehicle attribute values using the conditional probability;
   determine, using a machine learning model and the subset of the plurality of vehicle attribute values, a plurality of similarity metrics representative of similarities between the user-specified vehicle and the candidate vehicles; and
   provide for display identifiers of one or more candidate vehicles ranked based on the plurality of similarity metrics.

2. The non-transitory computer-readable medium of claim 1, wherein the machine learning model is trained to receive an input vector of a first dimension representing training vehicle attribute values and output an embedding vector of a second dimension representing the training vehicle attribute values, the second dimension smaller than the first dimension.

3. The non-transitory computer-readable medium of claim 1, wherein the plurality of vehicle attribute values are a first plurality of vehicle attribute values, and wherein the instructions further comprise instructions to:
   generate, using the machine learning model, embeddings using a second plurality of vehicle attribute values from an inventory of vehicles; and
   store the generated embeddings, wherein a plurality of reference embeddings include the generated embeddings, the plurality of reference embeddings associated with the candidate vehicles.

4. The non-transitory computer-readable medium of claim 1, wherein the plurality of vehicle attribute values includes one or more of a color, a make, a model, a year, or a safety feature.

5. The non-transitory computer-readable medium of claim 1, wherein the instructions further comprising instructions to determine, using the conditional probability, mutual information between a vehicle attribute of the plurality of vehicle attributes and a valuation amount of the vehicle attribute.

6. The non-transitory computer-readable medium of claim 5, wherein the instructions to select the subset of the plurality of vehicle attribute values using the conditional probability comprise instructions to select for input to the machine learning model, for each of a predefined number of the plurality of vehicle attributes of having high mutual information, a vehicle attribute value corresponding to the vehicle attribute.

7. The non-transitory computer-readable medium of claim 1, wherein the machine learning model is a neural network comprising a plurality of hidden layers, each hidden layer comprising a plurality of hidden nodes, wherein the instructions further comprise instructions to train the neural network by determining weights associated with connections between the plurality of hidden nodes to minimize a loss function such that generated embeddings are representative of similar valuation amount ranges for attributes mapped to an embedding.

8. The non-transitory computer-readable medium of claim 7, wherein the instructions further comprise instructions to re-train the neural network by adjusting a dimension of a hidden layer of the plurality of hidden layers to minimize a loss function of the neural network.

9. The non-transitory computer-readable medium of claim 7, wherein the instructions further comprise instructions to:
   receive user feedback; and
   re-train the neural network by adjusting the weights based on the received user feedback.

10. The non-transitory computer-readable medium of claim 7, wherein the instructions further comprise instructions to determine that the loss function is minimized by determining that a mean additive error between a valuation amount of a recommended vehicle output by the neural network and a valuation amount of a user-specified vehicle is below a threshold error.

11. The non-transitory computer-readable medium of claim 1, wherein the instructions further comprise instructions to re-train the machine learning model responsive to an update of an automotive inventory database in which a plurality of vehicle attribute-value pairs are stored.

12. The non-transitory computer-readable medium of claim 1, wherein the instructions to determine, using the machine learning model and the subset of the plurality of vehicle attribute values, further comprise instructions to calculate respective cosine similarities between concatenated embeddings output by the machine learning model and a plurality of reference embeddings.

13. A method comprising:
receiving a request to determine similarities between candidate vehicles and a user-specified vehicle associated with a plurality of vehicle attributes corresponding to a plurality of vehicle attribute values;
calculating a conditional probability between a vehicle attribute of the plurality of vehicle attributes and a valuation amount of the vehicle attribute;
selecting a subset of the plurality of vehicle attribute values using the conditional probability;
determining, using a machine learning model and the subset of the plurality of vehicle attribute values, a plurality of similarity metrics representative of similarities between the user-specified vehicle and the candidate vehicles; and
providing for display identifiers of one or more candidate vehicles ranked based on the plurality of similarity metrics.

14. The method of claim 13, wherein the machine learning model is trained to receive an input vector of a first dimension representing training vehicle attribute values and output an embedding vector of a second dimension representing the training vehicle attribute values, the second dimension smaller than the first dimension.

15. The method of claim 13, further comprising determining, using the conditional probability, mutual information between a vehicle attribute of the plurality of vehicle attributes and a valuation amount of the vehicle attribute.

16. The method of claim 15, wherein selecting the subset of the plurality of vehicle attribute values using the conditional probability comprises:
selecting for input to the machine learning model, for each of a predefined number of the plurality of vehicle attributes of having high mutual information, a vehicle attribute value corresponding to the vehicle attribute; and
adjusting the predefined number to minimize a loss function of the machine learning model.

17. A system comprising:
memory with instructions encoded thereon; and
one or more processors that, when executing the instructions, are caused to perform operations comprising:
receiving a request to determine similarities between candidate vehicles and a user-specified vehicle associated with a plurality of vehicle attributes corresponding to a plurality of vehicle attribute values;
calculating a conditional probability between a vehicle attribute of the plurality of vehicle attributes and a valuation amount of the vehicle attribute;
selecting a subset of the plurality of vehicle attribute values using the conditional probability;
determining, using a machine learning model and the subset of the plurality of vehicle attribute values, a plurality of similarity metrics representative of similarities between the user-specified vehicle and the candidate vehicles; and
providing for display identifiers of one or more candidate vehicles ranked based on the plurality of similarity metrics.

18. The system of claim 17, wherein the machine learning model is trained to receive an input vector of a first dimension representing training vehicle attribute values and output an embedding vector of a second dimension representing the training vehicle attribute values, the second dimension smaller than the first dimension.

19. The system of claim 17, wherein the operations further comprise determining, using the conditional probability, mutual information between a vehicle attribute of the plurality of vehicle attributes and a valuation amount of the vehicle attribute.

20. The system of claim 19, wherein selecting the subset of the plurality of vehicle attribute values using the conditional probability comprises:
selecting for input to the machine learning model, for each of a predefined number of the plurality of vehicle attributes of having high mutual information, a vehicle attribute value corresponding to the vehicle attribute; and
adjusting the predefined number to minimize a loss function of the machine learning model.

* * * * *